Dec. 12, 1950   V. E. MATULAITIS ET AL   2,533,274
BIMETALLIC THERMOSTATIC ELEMENT
Filed Nov. 28, 1944   2 Sheets-Sheet 1
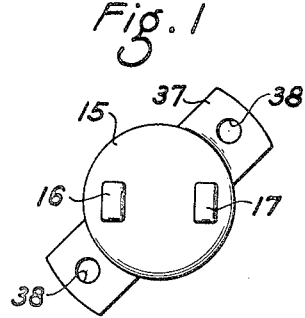
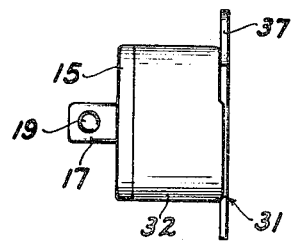
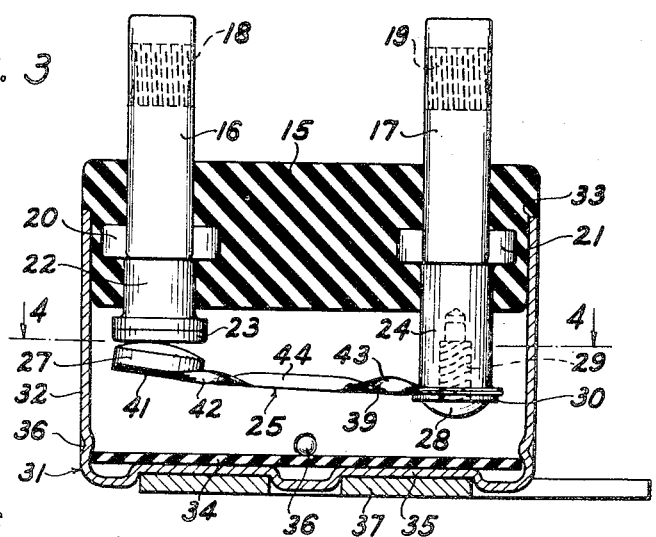
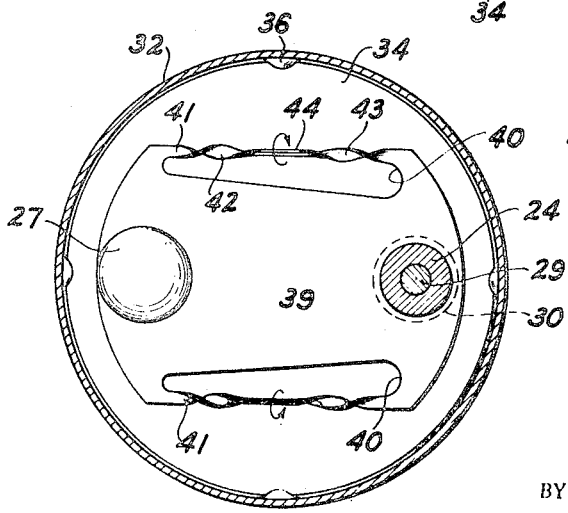
Victor E. Matulaitis
Peter M. Byam
INVENTORS
BY George A. Gillette, Jr.
ATTORNEY

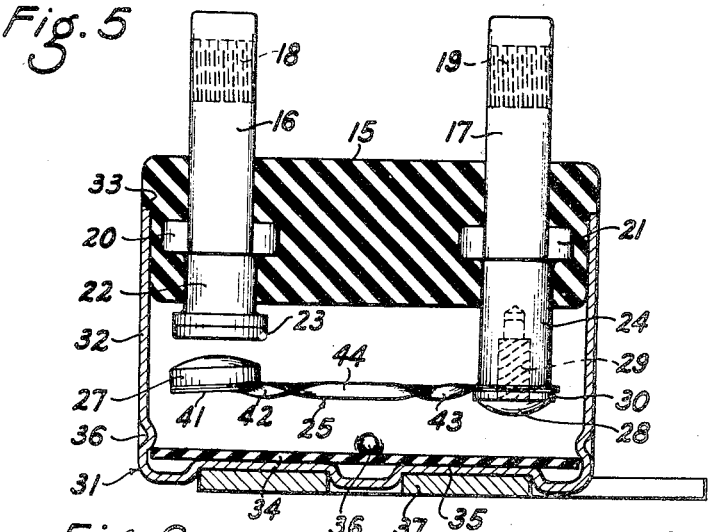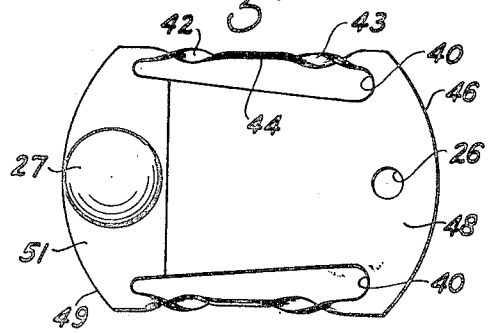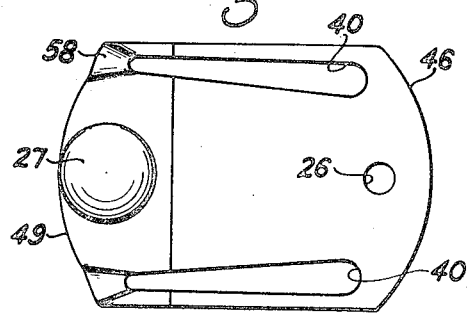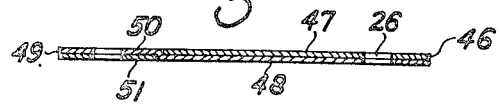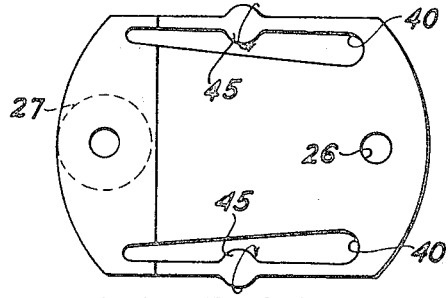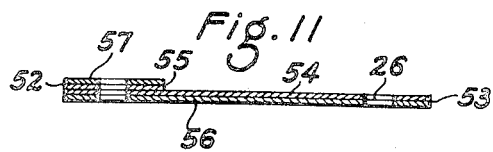

Patented Dec. 12, 1950

2,533,274

UNITED STATES PATENT OFFICE 2,533,274

BIMETALLIC THERMOSTATIC ELEMENT

Victor E. Matulaitis and Peter M. Byam, Rochester, N. Y., assignors to Fasco Industries, Inc., a corporation of New York Application November 28, 1944, Serial No. 565,556

16 Claims. (Cl. 297—15)

1

The present invention relates to an improved thermostatic element and relates more particularly to a bimetallic thermostatic element which is mechanically stressed for abrupt reversal when the element or a portion thereof is heated to a predetermined temperature.

While bimetallic thermostatic elements have previously been deformed to create a mechanical stress therein for snap action of the element, such deformations have been subject to one or more shortcomings, such as instability upon fatigue or overloads and/or critical relation between the deformations and mechanical stress in the element. Also various arrangements have been proposed to minimize the effect of variations in ambient temperature upon the operating temperature of the element but such known arrangements have been unsatisfactory for several reasons including separate mounting or handling, indirect effect, and/or increased energy consumption.

The primary object of the present invention is the provision of a bimetallic thermostatic element which is stable over long and severe operating conditions, which is progressively and accurately stressed to facilitate calibration, and which has a compensating portion attached thereto to maintain the mechanical stress in the element substantially constant in spite of variations in ambient temperature.

Another object of the invention is the provision of a bimetallic thermostatic element which has been mechanically stressed by deformation of an attached restraining member so as to resolve the tension therein into transverse components which are opposed by mechanical resistances created by said deformation.

A further object is the provision of one or more curved-plane-helical deformations in one or more restraining members of a thermostatic element for providing a mechanical stress therein for snap action thereof.

Still another object of the invention is the provision of a bimetallic thermostatic element having a restraining member which has been deformed in two different dimensions to shorten the length of said member in a third dimension or by twisting said restraining member for mechanical stressing of the thermostatic element.

A still further object is the provision of a compensating portion attached to said thermostatic element, either as an additional bimetallic strip or as an integral part thereof, and having a thermal characteristic such as to maintain the mechanical stress in said element substantially

2 constant in spite of changes in ambient temperature.

Other objects of the invention will be apparent to or understood by those skilled in the art by the description which follows.

The above and other objects of the invention are fulfilled by a thermostatic element having one or more curved-plane-helically deformed restraining members, and/or a compensating member or portion on said element having a thermal characteristic such as to maintain the mechanical stress in said element substantially constant in spite of variations in ambient temperature.

Reference is hereby made to the accompanying drawings wherein like reference characters designate similar elements and wherein:

Figs. 1 and 2 are respectively bottom and side views of a thermostatic switch assembly.

Fig. 3 is a vertical section through such thermostatic switch assembly including a bimetallic element constructed according to the invention.

Fig. 4 is a transverse section through said assembly taken on the line 4—4 of Fig. 3.

Fig. 5 is a vertical section similar to Fig. 3 but showing the bimetallic blade in open position.

Fig. 6 is also a bottom view of the preferred form of our improved thermostatic element.

Fig. 7 is a bottom view of a prior art thermostatic blade having a compensating portion according to this invention.

Fig. 8 is a top view of a bimetallic blank having an overlying compensating portion according to the invention and prior to deformation.

Figs. 9, 10 and 11 show various cross-sections of bimetallic blanks having compensating portions and which may be deformed according to the invention or in ways already known to the art.

Inasmuch as there is no single term that accurately and adequately defines the twisted deformation of the restraining member according to the invention, it is necessary to adopt the coined phrase "curved-plane-helical," and variations thereof, to describe the shape of the twisted portions of the restraining members throughout the specification and claims.

In the illustrated embodiment, the thermostatic switch assembly comprises a base 15 preferably molded from insulating material and having imbedded therein studs 16 and 17. Said studs 16 and 17 are each provided with threaded openings 18 and 19 to facilitate attachment of a wire or connector and preferably have integral collars 20 and 21 also embedded in base 15 and facilitating the molding operation. The stud 16 has a head 22 extending out of base 15 and carrying a contact 23. The stud 17 includes a post 24 also extending out of base 15.

A bimetallic snap acting thermostatic element designated generally as 25 has an opening 26 at one end and carries a contact 27 on its other end. A headed stud 28 has a threaded shank 29 extending through a washer 30 and into a bore in the end of post 24. Preferably said switch assembly is enclosed by a cylindrical cap member 31 having a cylindrical side wall 32 fitting over the periphery of base 15 and abutting against a shoulder 33 thereon. An insulating disc 34 is held adjacent the top wall 35 of cap member 31 by a plurality of protuberances 36 deformed inwardly from wall 32. A mounting strip 37 is provided at each end with openings 38 and is intermediately attached to the top wall 35 of cap member 31.

In general the mechanical stress in the bimetallic element for snap action thereof is created by deforming a restraining member integral with the thermostatic element, however, the invention also contemplates deformation of a restraining member which is only attached or operatively connected to the bimetallic element. As shown, the thermostatic element comprises a body member 39 preferably with parallel sides and provided with a pair of tapered elongated slots 40 in spaced relation to the sides of the body member 39 and forming a pair of elongated restraining members 41. The body member 39 has a diverging shape away from the fixed end thereof whereby the thermostatic element has a greater amplitude of movement at its free end for greater separation of contacts 23 and 27, has more uniform heating particularly under high overloads, and has a generally longer life because of freedom from "hot spots" even when overloaded.

The deformation of the restraining member 41 is effected in two transverse directions to shorten its length and so that the forces or tension in the restraining member are resolved into components which are directly and beneficially opposed by transverse resistances in the restraining member. The best manner of realizing such resolution of stresses is to twist the restraining member to create curved-plane-helical deformations therein. Alternatively the restraining member can be twisted and attached under tension to the thermostatic element. Preferably the restraining member 41 so deformed is composed of bimetal like or intergal with the body member 39 although said restraining member may be composed of unimetal.

As shown in Figs. 3, 4 and 5 the restraining member 41 has two curved-plane-helical deforrations 42 and 43 of opposite hand and an intermediate flat portion 44. Such opposed curved-plane-helical deformations 42 and 43 are made by engaging the intermediate flat portion 44 and twisting it any number of turns and/or fraction of a turn to place the required mechanical stress in the thermostatic element. For this purpose the intermediate flat portion 44 can be of greater area than the remainder of the restraining member as by providing ears 45 therein as shown in Fig. 8.

The direction of twisting the restraining members 41 and/or the hand of the curved-plane-helical deformations 42 and 43 is not critical although actual tests show that better results are obtained by twisting the intermediate portions 44 inwardly toward the side of the bimetal to be rendered concave by being placed under compression or in the direction indicated by the arrows on Figs. 4 and 8.

The result of such curved-plane-helical deformation of one or more of the restraining members is to stress mechanically the thermostatic element. As is known, if the element is to operate upon an increase in temperature, the face of the bimetal having the higher coefficient of expansion is placed under compression or made concave. Conversely if the thermostatic element is to operate upon a decrease in temperature, the face of the bimetal having the lower coefficient of expansion is placed under compression or rendered concave. When twisted or curved-plane-helically deformed the restraining member 41 is somewhat below the plane of the body member 39, as shown in Fig. 3, and the contact 27 is normally pressed against the contact 23 for good contact therewith. When subjected to a change in temperature, the mechanical stresses in the bimetal overcome the preformed mechanical stresses abruptly and the thermostatic element reverses its curvature in the manner shown in Fig. 5 with the intermediate portions 44 on the other side of the plane of the body member 39.

The curved-plane-helical deformation of the restraining member has several known manufacturing advantages and operating advantages. The manufacturing advantages are a more progressive and accurately controlled stressing operation and the ability to determine by inspection the amount of stress created by the deformation. Since the deformation is caused by angular rotation of the intermediate portion 44 with respect to the body portion or of a tool, the number of turns and/or fraction of turns of such tool or intermediate portion can be accurately measured and the amount of stress can be observed by counting the number of twists in the curved-plane-helical deformations and the position of the flat intermediate portion relative to the body member. The shortening of the restraining member by the curved-plane-helical deformation is so indirect that two or more complete turns of the intermediate portion are ordinarily required. Hence substantially the same stress is created even though the rotation of said intermediate portion varies several degrees but the rotatable stressing is of such nature that it can be reproduced even under mass production conditions within a very few degrees of rotation.

The operating advantages of said curved-plane-helical deformation of the restraining member are greater stability, greater resistance to fatigue or change even by overloads, and the ability to determine by mere inspection whether any change in mechanical stress has occurred. Such greater stability or resistance, particularly as compared to a transverse crimp, has been found by actual test and is probably because of the resolution of the tension in the restraining member during reversal of the element into components acting only indirectly against the deformation and/or including transverse components which are opposed by transverse resistances. The laws of mechanics dictate that the tension in the restraining member, either by deformation or by reversal of the element, at each increment of the curved-plane-helical deformation is resolved into a longitudinal component and a transverse component and that the proportion of the transverse component to the longitudinal component will be determined by the pitch of the curved-plane-helix. In other words the tension in the restraining member acts only indirectly to restore the restraining member to its original condition as compared to the direct action of such tension to straighten or restore a transverse crimp to its original unstressed condition. Consequently, the indirect effect of the tension or the increased area of the resistances and/or transverse resistances thereto result in greater stability and longer life of the curved-plane-helically deformed restraining member even under severe overload conditions.

Another feature of the invention is construction of the bimetallic element so that changes in ambient temperature will not affect the time and/or temperature of operation. Heretofore such compensation has been sought by maintaining a substantially constant ambient temperature or by varying the position of the contacts, both of which arrangements have obvious disadvantages. According to the invention the bimetallic element itself carries and/or includes a compensating portion having a thermal characteristic such as to maintain the mechanical stress in the thermostatic element at such a value that the time and/or temperature of operation are not affected by changes in ambient temperature.

Such compensation may be accomplished in several ways some of which are shown in Figs. 6-11 inclusive. The preferred arrangement is to associate a bimetallic compensating member with the main bimetallic member and arranged in opposition to the mechanical stresses therein and which association or arrangement can be accomplished in the manufacture or rolling of the bimetallic sheet material. The body member 46 is composed of a bimetallic sheet material and, as usual, has a face 47 composed of a metal of relatively low coefficient of expansion and a face 48 composed of a metal of relatively high coefficient of expansion. A transverse compensating portion 49 is composed of bimetallic sheet material in reversed relation, with a face 50 of high coefficient of expansion coextensive with or in the same plane as face 47 of the body member and with a face 51 of relatively low coefficient of expansion co-extensive with or in the same plane as face 48 of the body member 46.

The aforementioned arrangement of the compensating portion 49 on the body member 46 can be conveniently accomplished during rolling by having the faces of one type of metal continuous and by rolling faces of metal having the different coefficient of expansion into opposite sides of the continuous layer. For example as illustrated in Fig. 9 the faces 48 and 50 composed of metal of relatively high coefficient of expansion may be continuous and the faces 47 and 51 of lower coefficient of expansion are rolled into opposite sides of the continuous layer forming faces 48 and 50. Alternatively, as shown in Fig. 10, the compensating portion 49 may be butt welded in reverse bimetallic relation to body member 46 with faces 47 and 50 and faces 48 and 51 in the same planes. Such butt joining of the bimetallic body portion 46 and compensating portion 49 in reversed relation or in thermal opposition as shown in Fig. 10 may also be accomplished by rolling according to known techniques. Still further, as shown in Fig. 11, the compensating portion 52 may be operatively connected in overlying relation or lap welded to a body member 53 in thermal opposition or with the respective faces 54 and 55 of metal of low coefficient of expansion adjacent each other so that the outer faces 56 and 57 respectively of the body member 53 and compensating portion 52 are composed of metal of relatively high coefficient of expansion.

The body members and compensating portions thereof or thereon are mechanically stressed in any manner for snap action in either direction or upon heating or cooling. For example the thermostatic element or the blank shown in Fig. 8 may be stressed by twisting the restraining members 41 according to the invention and as shown in Fig. 6 or may be stressed by providing crimped portions 58 at the ends of the slots 40 as shown in Fig. 7. In any case the compensating member or bimetallic element to be reversed by heating will oppose and prevent decrease of the mechanical stress as the ambient temperature increases and will oppose and prevent increase of the mechanical stress in the thermostatic element as the ambient temperature decreases. Similarly, the action of the compensating member on a bimetallic element to be abruptly reversed by cooling will oppose or balance out the tendency of the mechanical stress to increase as the ambient temperature increases or the tendency of the mechanical stress to decrease with decreasing ambient temperature. The most effective relative arrangement of the compensating member is as a strip extending transversely of the thermostatic element or perpendicularly of the tension created by the restraining member as shown in Figs. 6 to 11. By keeping the mechanical stress in the snap acting thermostatic element substantially constant it is clear that the time and/or temperature of element reversal under given element heating or cooling conditions will also remain constant or uniform which is very necessary when, as is often the case, the thermostatic element is used as a protective device against overloads.

By its nature the compensating feature of the invention is limited to thermostatic elements that are heated by an electrical current passing therethrough or by heat radiated or conducted directly to the body member. On the the other hand the feature of curved-plane-helically deforming the restraining member has no limitations and may be utilized in a thermostatic element for abrupt reversal at a predetermined temperature of the body member irrespective of the source of heat. The illustrated embodiment shows said element in an assembly for heating by an electric current but such illustration is merely in the interest of completeness and shall not in any respect limit the scope of the invention. Since many variations or modifications of the inventions shown herein are possible the present disclosure is merely illustrative and the true scope of the invention is defined in the claims which follow.

Having now particularly described our invention, what we desire to secure by Letters Patent of the United States and what we claim is:

1. A thermostatic element comprising a body member of bimetallic sheet material, a restraining member connected between spaced portions of said body member and twisted mechanically to stress said body member for snap action, to resolve the tension on said restraining member into transverse and longitudinal components and to provide mechanical resistances in direct opposition to said transverse components, and a compensating portion operatively connected to said body member and having a thermal characteristic in opposition to and such as to maintain the mechanical stress in said body member substantially constant with changes in the ambient temperature.

2. A thermostatic element comprising a body member of bimetallic sheet material, a restraining member connected between spaced portions of said body member and twisted mechanically about a torsional axis penetrating and extending along said restraining member to stress said body member for abrupt reversal when brought to a predetermined temperature, and a compensating portion operatively connected to said body member and having a thermal characteristic in opposition to and maintaining the mechanical stress in said body member substantially constant with changes in the ambient temperature.

3. A thermostatic element comprising a body member of bimetallic sheet material, a restraining member connected between spaced portions of said body member and twisted mechanically about a torsional axis penetrating and extending along said restraining member to stress said body member for abrupt reversal when brought to a predetermined temperature, and a compensating portion composed of a bimetallic sheet material, operatively connected to said body member in thermal opposition thereto and for maintaining the mechanical stress in said body member substantially constant with changes in the ambient temperature.

4. A thermostatic element comprising a body member of bimetallic sheet material, a restraining member connected between spaced portions of said body member, and a curved-plane-helical deformation in said restraining member about an axis penetrating and extending along the same to resolve the tension upon said restraining member into transverse and longitudinal components and to provide mechanical resistances in direct opposition to said transverse components.

5. A thermostatic element comprising a body member of bimetallic sheet material, a restraining member connected between spaced portions of said body member, and a curved-plane-helical deformation in said restraining member about an axis penetrating and extending along the same and stressing said body member for snap action thereof.

6. A thermostatic element comprising a body member of bimetallic sheet material, a restraining member connected between spaced portions of said body member, and a pair of opposite hand curved-plane-helical deformations in said restraining member about an axis penetrating and extending along the same and stressing said body member for snap action thereof.

7. A thermostatic element comprising a body member of bimetallic sheet material, a restraining member connected at opposite ends to spaced portions of said body member, and having a flat intermediate portion, and a curved-plane-helical deformation in said restraining member about an axis penetrating and extending along the same between said intermediate portion and each of its ends.

8. A thermostatic element comprising a body member of bimetallic sheet material, a restraining member connected at opposite ends to spaced portions of said body member, and having a flat and enlarged intermediate portion, and a curved-plane-helical deformation in said restraining member about an axis penetrating and extending along the same between said intermediate portion and each of its ends.

9. A thermostatic element comprising a body member of bimetallic sheet material having opposite faces respectively composed of metals having different coefficients of expansion, a restraining member connected at opposite ends to spaced portions of said body member, and a curved-plane-helical deformation in said restraining member about an axis penetrating and extending along the same and stressing said body member to render concave the face composed of the metal of higher coefficient of expansion for snap action of said body member upon heating thereof.

10. A thermostatic element comprising a body member of bimetallic sheet material having opposite faces respectively composed of metals having different coefficients of expansion, a restraining member connected at opposite ends to spaced portions of said body member, and a curved-plane-helical deformation in said restraining member about an axis penetrating and extending along the same and stressing said body member to render concave the face composed of the metal of lower coefficient of expansion for snap action of said body member upon cooling thereof.

11. A thermostatic element comprising a body member having parallel sides and composed of bimetallic sheet material having one face composed of a metal having a coefficient of expansion greater than that of the metal composing the other face, said body member being provided with a pair of elongated slots each substantially parallel to said sides to form a pair of restraining members connected at each end to said body member, and curved-plane-helical deformations in each of said restraining members about an axis penetrating and extending along the same and mechanically stressing said body member so that one face thereof is concave.

12. A thermostatic element comprising a body member of bimetallic sheet material, a restraining member connected between spaced portions of said body member, and deformed mechanically to create a single curvature in and to stress said body member for abrupt reversal at a predetermined temperature, and a compensating portion operatively connected in inverted bimetallic relation to said body member and opposing, upon change in temperature, change in curvature of and stress in said body member and having a thermal deflection in opposition to and maintaining the mechanical stress in said body member substantially constant with changes in the ambient temperature whereby abrupt reversal of said body member occurs at substantially said predetermined temperature irrespective of the existing ambient temperature.

13. A thermostatic element comprising a body member of bimetallic sheet material, a restraining member connected between spaced portions of said body member, and deformed mechanically to create a single curvature in and to stress said body member for abrupt reversal at a predetermined temperature, and a compensating portion composed of bimetallic sheet material, overlying and attached to said body member in inverted bimetallic relation and in thermal opposition thereto and maintaining the mechanical stress in said body member substantially constant in spite of changes in ambient temperature.

14. A thermostatic element comprising a body member of bimetallic sheet material, a restraining member connected between spaced portions of said body member, extending longitudinally thereof and deformed mechanically to stress said body member, and a compensating portion composed of a bimetallic sheet material, operatively connected to said body member in inverted bimetallic relation and in transverse relation to said restraining member and maintaining the mechanical stress in said body member substantially constant with changes in the ambient temperature.

15. A thermostatic element comprising a body member of bimetallic sheet material, a restraining member connected between spaced portions of said body member, and deformed mechanically to create a single curvature in and to stress said body member for abrupt reversal at a predetermined temperature, and a compensating portion composed of bimetallic sheet material, formed integrally with and overlying said body member in inverted bimetallic relation and in thermal opposition to the mechanical stress therein and maintaining the mechanical stress in said body member substantially constant in spite of changes in ambient temperature.

16. A thermostatic element comprising a body member of bimetallic sheet material, a restraining member connected between spaced portions of said body member, extending longitudinally thereof and deformed mechanically to stress said body member, and a compensating portion composed of a bimetallic sheet material attached to said body member in inverted bimetallic relation and in overlying and transverse relation and maintaining the mechanical stress in said body member substantially constant with changes in the ambient temperature.

VICTOR E. MATULAITIS.
PETER M. BYAM.

REFERENCES CITED

The following references are of record in the file of this patent:

UNITED STATES PATENTS

| Number | Name | Date |
|---|---|---|
| 1,542,385 | Harris | June 16, 1925 |
| 1,813,122 | Moore | July 7, 1931 |
| 1,991,496 | Derby | Feb. 19, 1935 |
| 1,998,108 | Waisner | Apr. 16, 1935 |
| 2,070,108 | Bargeboer | Feb. 9, 1937 |
| 2,086,857 | Derby | July 13, 1937 |
| 2,090,312 | Sawyer | Aug. 17, 1937 |
| 2,145,040 | Cawthra | Jan. 24, 1939 |
| 2,189,459 | Derby | Feb. 6, 1940 |
| 2,238,034 | Chace | Apr. 15, 1941 |
| 2,249,837 | Lee | July 22, 1941 |
| 2,255,169 | Ireland | Sept. 9, 1941 |
| 2,259,312 | Lee | Oct. 14, 1941 |
| 2,278,744 | Sparrow | Apr. 7, 1942 |
| 2,332,416 | Waltenberg | Oct. 19, 1943 |
| 2,332,518 | Koci | Oct. 26, 1943 |
| 2,336,408 | Matthews | Dec. 7, 1943 |
| 2,387,903 | Hansel | Oct. 30, 1945 |
| 2,457,132 | Delaney | Dec. 28, 1948 |